United States Patent [19]

Hara et al.

[11] Patent Number: 4,875,845
[45] Date of Patent: Oct. 24, 1989

[54] INJECTION NOZZLE FOR AN INJECTION MOLDING MACHINE

[75] Inventors: Hitoshi Hara, Funabashi; Hiroyoshi Sumen, Chiba, both of Japan

[73] Assignee: Sumitomo Heavy Industries, Ltd., Tokyo, Japan

[21] Appl. No.: 298,609

[22] PCT Filed: Mar. 29, 1988

[86] PCT No.: PCT/JP88/00312
§ 371 Date: Nov. 28, 1988
§ 102(e) Date: Nov. 28, 1988

[87] PCT Pub. No.: WO88/07446
PCT Pub. Date: Oct. 6, 1988

[30] Foreign Application Priority Data

Mar. 31, 1987 [JP] Japan .................................. 62-46691
Aug. 7, 1987 [JP] Japan .................................. 62-120347

[51] Int. Cl.⁴ .............................................. B29C 45/78
[52] U.S. Cl. ................................ 425/143; 264/328.15; 425/144; 425/549; 425/562; 425/568
[58] Field of Search .................... 219/301; 264/328.15; 425/143, 144, 547, 549, 562, 568

[56] References Cited
FOREIGN PATENT DOCUMENTS 57-62848  4/1982  Japan .
57-199426 12/1982 Japan .
58-1213   1/1983  Japan .

Primary Examiner—Jay H. Woo
Assistant Examiner—Timothy W. Heitbrink
Attorney, Agent, or Firm—Armstrong, Nikaido, Marmelstein, Kubovcik & Murray

[57] ABSTRACT

An injection nozzle for an injection molding machine having a heating device for heating its injection nozzle body (3) protruding from the front end of the heating cylinder (1) thereof. The heating device is composed of a plurality of heating members (7, 10) longitudinally arranged side by side. The temperatures of the different nozzle body sections heated by the respective heating members are individually detected (9, 11), the heating members (7, 10) being individually controlled in accordance with the temperatures thus detected. The construction enables the different nozzle body sections to be individually set to a desired, optimum temperature. The nozzle front end section 3b, for example, which is in contact with a metallic mold and whose temperature is consequently apt to be lowered can be kept high, and the nozzle middle-rear section 3a, which is near the heating cylinder and whose temperature is consequently apt to be raised, can be kept low. The construction has the effect of preventing the stringing or drooling of resin, which is apt to occur in an injection nozzle which utilizes a single nozzle heating device. It also has the effect of preventing resin burning, reducing the pressure loss of resin passing through the nozzle front end section and so on.

3 Claims, 3 Drawing Sheets

INJECTION NOZZLE FOR AN INJECTION MOLDING MACHINE

TECHNICAL FIELD

This invention relates to an injection nozzle for an injection molding machine, and in particular, to an injection nozzle protruding from the front end of a heating cylinder and utilized for injecting molten material into a metallic mold.

BACKGROUND ART

The injection nozzle front end section of an injection molding machine is in contact with a metallic mold, which is cooled to a low temperature. The injection nozzle is consequently apt to be cooled, too. In order to prevent this, the injection nozzle itself is conventionally heated separately, independently of the heating cylinder. Since, however, this separate heating is performed with a single heating device such as a coil heater, the following problems are involved:

Since the injection nozzle end is in contact with a metallic mold, which is set at a temperature much lower than the melting point of molten material such as plastics, its temperature is lower than the set value of the injection nozzle temperature normally by several tens of degrees C. In the rear section of the injection nozzle, on the other hand, there is heat transfer from the heating cylinder. This situation, along with the low heat radiation from the injection nozzle, makes the nozzle rather overheated, resulting in an uneven heat distribution over the nozzle itself. This is readily appreciated from FIG. 3, which shows the result of an investigation into the heat distribution of an injection nozzle. In FIG. 3, the two-dot chain line A represents the heat distribution when the temperature control is effected by detecting the temperature in the rear section of the injection nozzle. The dashed line B represents the heat distribution when the temperature is controlled with a temperature detecting apparatus provided in the vicinity of the injection nozzle front end.

The temperature control is thus performed with only one system for detecting and controlling nozzle temperature, inspite of the temperature difference of several tens of degrees C. between the front end and the rear section of an injection nozzle. Setting the nozzle front end to an appropriate temperature consequently results in a raised temperature in the nozzle rear section, which causes the resin to be overheated until it is "burned". In addition, the resin pushed out through the nozzle drips from the nozzle opening, presenting a phenomenon called "stringing" or "drooling". When, on the other hand, the temperature setting is conducted to the nozzle rear section, the tip resistance is increased, augmenting the pressure loss, a situation which leads to increased variation in molding.

In view of the above problems, the present invention aims at providing an injection nozzle for an injection molding machine which prevents the drooling or stringing of resin from the injection nozzle front end as well as resin burning, and which is capable of stabilizing products and reducing pressure loss by keeping the injection nozzle front end section having a narrowed passage at an appropriate temperature.

DISCLOSURE OF INVENTION

In accordance with this invention, there is provided an injection nozzle for an injection molding machine the nozzle body of which is protruding from the front end of the heating cylinder thereof, said injection nozzle comprising a plurality of electric heating members surrounding said nozzle body and longitudinally arranged side by side, a plurality of temperature detecting members for detecting the temperatures of the different nozzle body sections surrounded by said heating members, and a control mechanism for individually controlling said plurality of heating members in accordance with the detected temperatures of said temperature detecting members.

Because of the above construction, the temperature control of the injection nozzle in accordance with this invention is in individually so effected that the nozzle front end section in the vicinity of a metallic mold is set to a relatively high temperature, whereas the nozzle middle-rear section is set to a normal temperature. The problems due to the overheating of the nozzle middle-rear section and the temperature fall at the nozzle front end can consequently be overcome.

In accordance with a preferred embodiment of this invention, the plurality of heating members are composed of coil heaters and the lead wire of the coil heater surrounding the front end section of the nozzle body is arranged such that it forms a multiple coil together with the adjacent coil heater on the rear end section, so that the entire injection nozzle need not have a large outer diameter to secure the space for arranging the lead wires.

BEST MODE OF CARRYING OUT THE INVENTION

Figure 1:
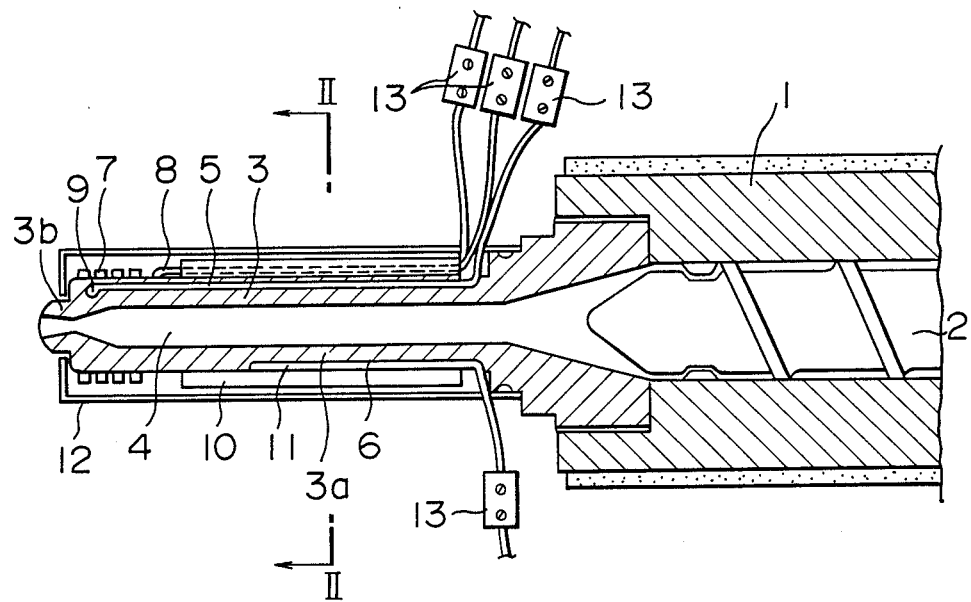
FIG. 1 is a longitudinal sectional view of the first embodiment of this invention.
Figure 2:
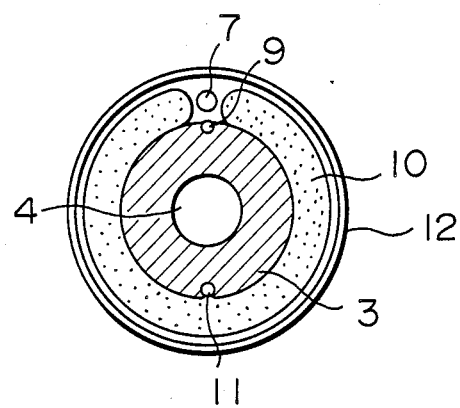
FIG. 2 is a cross-sectional view taken along the line II—II of FIG. 1.

Embodiments of the injection nozzle for an injection molding machine in accordance with this invention will now be described with reference to the attached drawings. FIGS. 1 and 2 show the first embodiment of this invention. A nozzle body 3 protrudes from the front end of a heating cylinder 1 containing a screw 2. The nozzle body 3 is detachably connected to the heating cylinder 1 with screwing means or the like. This nozzle body 3 includes a passage 4, an axial through-hole 5, and an axial groove 6 which is in the middle-rear section 3a of the nozzle body.

A coil heater 7 with a square cross-section which serves as the first heating member is wound around the outer peripheral surface of the front end section 3b of the nozzle body 3, and a lead wire 8 is connected to the rear end of the coil heater. This coil heater 7 occupies the nozzle area which extends 40 mm or less from the front end.

A temperature detecting thermo-couple 9 for detecting the temperature of the coil heater 7 is provided in the above through-hole 5 in the nozzle body 3. The front end of the thermo-couple 9 is embedded in the nozzle body 3 in the direction of the front end section 3b, and is connected to a temperature controller (not shown) through convenience outlets 13.

A band heater 10 which is made of a shape memory alloy or a bimetal or the like and which is inwardly tightened as the temperature rises is wound around the outer peripheral surface of the middle-rear section 3a of the nozzle body 3 and serves as the second heating member. A temperature detecting thermocouple 11 is arranged in the above groove 6 such that it is held between the band heater 10 and the nozzle body 3, and is connected to a temperature controller (not shown) through a convenience outlet 13.

A heater cover 12 for protecting the first and second heating members wound around the above nozzle body 3 is provided in such a manner that the front end section 3b of the nozzle body 3 is fitted into the opening at the front end thereof.

Figure 3:
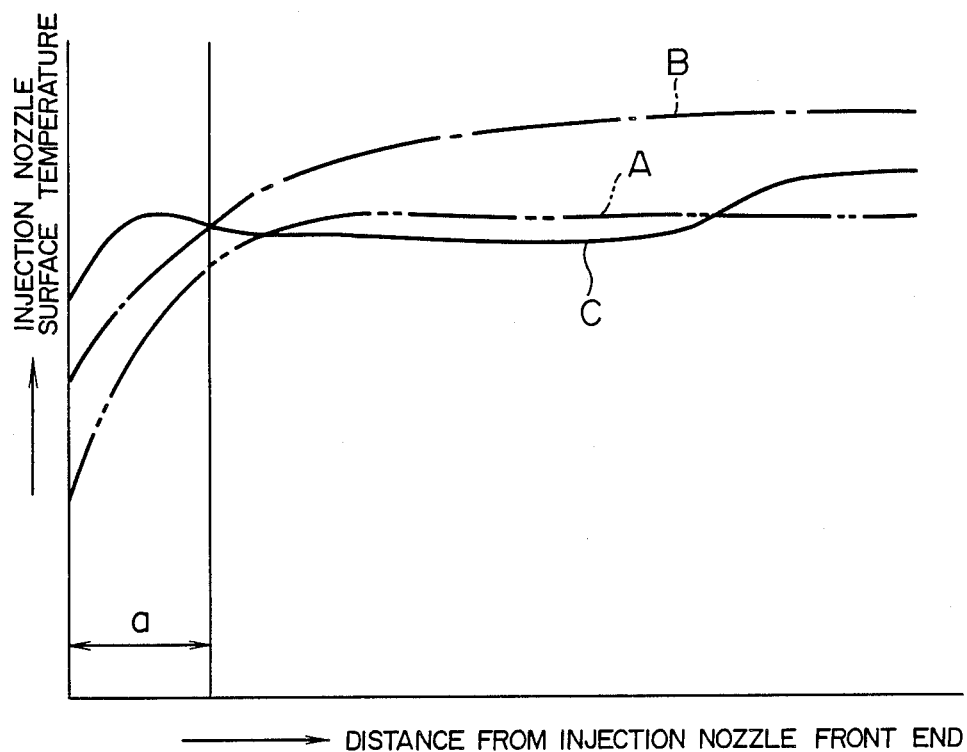
FIG. 3 is a chart showing the relation between the positions on the injection nozzle and the temperature.

It is naturally understood that various heating means such as electromagnetic induction heating may be adopted as the heating means, apart from usual heating means. The reference character a in FIG. 3 indicates the nozzle length range extending 40 mm or less from the nozzle front end, and the curve C represents the result of controlling the injection nozzle temperature with two control systems in accordance with this invention.

As described above, the injection nozzle in accordance with this invention includes two thermocouples, one (reference numeral 9 in FIG. 1) provided in a section affected by the temperature of an metallic mold, and the other (reference numeral 11 in FIG. 1) in a section particularly related to such phenomena as stringing or drooling. These thermo-couples are connected in a usual manner to respective temperature controllers, the thermo-couple 9 controlling the electricity supply to the coil heater 7 and the thermocouple 11 the electricity supply to the band heater 10. The coil heater 7 and the band heater 10 can accordingly be separately temperature-controlled. The nozzle temperature represented by the curve C of FIG. 3 can be obtained as a result, by setting the nozzle front end section 3b, which exhibits the highest resistance and which is most subject to temperature fall, to a high temperature, and setting the nozzle middle-rear section 3a to the normal temperature. The temperature fall at the nozzle front end section can thus be substantially mitigated.

Since the injection nozzle for an injection molding machine in accordance with this invention is, as described above, capable of separately effecting the temperature control of the nozzle front end section and that of the nozzle middle-rear section, the following effects can be obtained with it:

(1) Since the temperature of the nozzle front end section and that of the nozzle middle-rear section can be separately set and controlled, the temperature fall and the stringing or drooling of resin at the nozzle front end can be prevented.

(2) Since a whole-resin type open nozzle can be adopted instead of such nozzles as a needle valve nozzle, whose operation is a mechanical one, the mechanical reliability of the nozzle can be enhanced, the nozzle being enabled to become narrower than ever.

(3) Since the temperature of the nozzle front end section can be raised and the resistance is decreased and stabilized, variation in size of molded articles can be reduced.

(4) Since a narrow nozzle can be inserted and the sprue is shortened, a substantial decrease in material cost can be expected.

(5) Since a narrow nozzle can be used, nozzle holes provided in metallic molds can also be narrow, so that the rigidity of metallic molds can be augmented, with the burr generation decreased.

Figure 4:
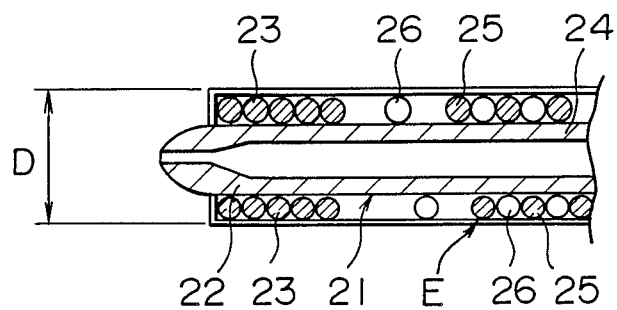
FIG. 4 is a longitudinal sectional view of the second embodiment of this invention.
Figure 5:
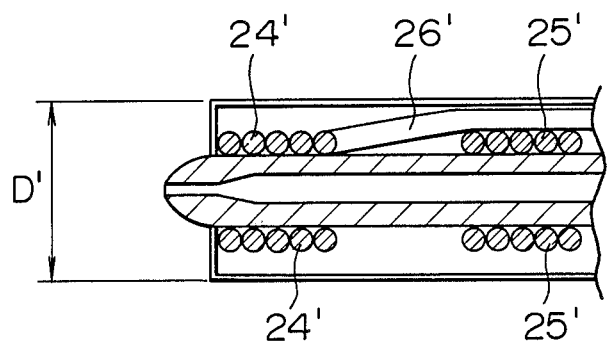
FIG. 5 is a longitudinal sectional view showing the conventional arrangement of the lead wires where the arrangement of FIG. 4 is not adopted.

FIG. 4 shows the second embodiment of this invention. In this embodiment, the second heating member for heating the nozzle body middle-rear section is formed as a coil heater as is the first heating member for the front end section. As shown in FIG. 5, the lead wire 26' of the first coil heater 24' normally extends over the second coil heater 25', so that the outer diameter D' of the nozzle has to become larger. A large nozzle insert hole accordingly has to be provided for this nozzle to be inserted into a metallic mold, which will involve lowered metallic mold strength. In order to overcome this problem, the second embodiment of this invention, which is shown in FIG. 4, has been conceived.

As shown in FIG. 4, temperature controlling heaters are wound in a coil-like manner around a nozzle body 21 having a relatively small outer diameter and a relatively large length, at two or three or more positions longitudinally along the body. In drawing, a first coil heater 23 is wound around a nozzle front end section 22, and a second coil heater 25 around a nozzle middle-rear section 24. The second coil heater 25 forms a multiple coil structure E together with a lead wire 26 which does not develop heat. In this case, a double-coil structure is formed by passing the lead wire 26 of the first heater 23 through the space defined by the second heater 25, i.e., by winding the second heater 25 and the lead wire 26 alternately in a spiral manner.

Further, a temperature detecting section (not shown) is provided in the vicinity of the nozzle front end section 22 so as to control the electric current to be applied to the first heater 23, in accordance with the detected temperature value. The first heater 23 is connected to a power supply controller (not shown) through a connector (not shown), the power supply controller supplying electricity to the first heater 23 or stopping the electricity supply thereto, in accordance with a signal from the above temperature detecting section.

On the other hand, a temperature detecting section (not shown) is provided in the vicinity of the nozzle middle-rear section 24, as in the above nozzle front end section 22, in order to control the electric current to be applied to the second heater 25, in accordance with the temperature value detected by the temperature detecting section. The second heater 25 is connected to a power supply controller (not shown) through connector (not shown), the power supply controller supplying electricity to the second heater 25 or stopping the electricity supply thereto, in accordance with a signal from the above temperature detecting section. Thus, the temperature of the first heater 23 and that of the second heater 25 are separately controlled. The reference character D in the drawing represents the maximum outer diameter of the nozzle.

Since the temperature control system for the second embodiment of this invention is in the form of a multiple coil structure formed by the second heater and the lead wire of the first heater, the nozzle has a small diameter and can be inserted deep into a metallic mold. In addition to the correct temperature control, it has the advantage of not requiring any modification of nozzle insert holes. The existing metallic molds can consequently be used as they are and deterioration in mold strength can be prevented.

What is claimed is:

1. An injection nozzle for an injection molding machine having a nozzle body protruding from a front end of a heating cylinder thereof, said injection nozzle comprising a plurality of electric heating members each member surrounding a different nozzle body section of said nozzle body and longitudinally arranged side by side, a plurality of temperature detecting members, each of said temperature detecting members detecting the temperature of each respective nozzle body section surrounded by a respective heating member, and a control mechanism for individually controlling said plurality of heating members in accordance with the detected temperatures of said temperature detecting members.

2. An injection nozzle as claimed in claim 1, wherein said plurality of heating members comprises a first heating member and a second heating member, said first heating member consisting of a coil heater surrounding a front end section of said nozzle body and said second heating member consisting of a band heater surrounding a middle-rear section of said nozzle body.

3. An injection nozzle as claimed in claim 1, wherein said plurality of heating member comprises first and second coil heaters, said first coil heater surrounding a nozzle front end section and said second coil heater surrounding a nozzle middle rear section, wherein said second coil heater forms a multiple coil structure together with a lead wire of said first coil heater.

* * * * *